United States Patent [19]

Wang

[11] Patent Number: 4,928,397

[45] Date of Patent: May 29, 1990

[54] GOLF CLUB HEAD SURVEYING INSTRUMENT

[76] Inventor: Kuen-Yi Wang, No. 46, Lane 380, Chung San East Rd., Fong San, Kaohsiung Hsien, Taiwan

[21] Appl. No.: 286,813

[22] Filed: Dec. 20, 1988

[51] Int. Cl.$^5$ .............................................. G01B 5/24
[52] U.S. Cl. ..................................................... 33/508
[58] Field of Search ......................................... 33/508

[56] References Cited

U.S. PATENT DOCUMENTS 4,817,254  4/1989  Lai ....................................... 33/508

Primary Examiner—Harry N. Haroian
Attorney, Agent, or Firm—Varndell Legal Group

[57] ABSTRACT

This invention is directed to a golf club head surveying instrument includes a bottom block, a quarter circle scale plate, an adjusting frame, a V-shaped block, a balance block, a slide block, and a rectangular block. The adjusting frame is fixed to the scale plate with its rear end, the V-shaped block is mounted on the adjusting frame and arranged to provide a clamping element for holding a golf club. An adjusting knob is provided with the scale plate for angular adjusting. The slide block is mounted on the balance block to support the rectangular block. The rectangular block is arranged to provide a trifurcate balance board for balance checking of the head of the golf club to be tested. The present invention is useful in helping golf club manufacturers to check and correct the percentage of inclination of the head, distributors to assemble golf clubs, and golf players to adjust the angle of the golf club to fit in with ones preference in driving a golf ball.

8 Claims, 3 Drawing Sheets

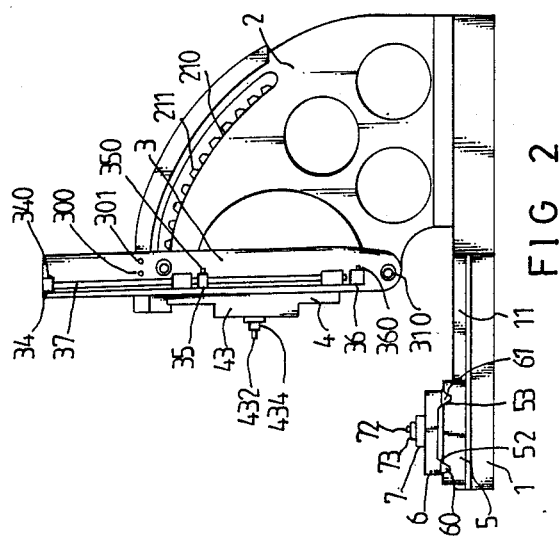

GOLF CLUB HEAD SURVEYING INSTRUMENT

BACKGROUND AND SUMMARY OF THE INVENTION

This invention is directed to a surveying instrument assist golf sporting goods' manufacturers, distributors or players to precisely survey the angular quality of a golf club head, and to adjust the percentage of inclination of the head and the strike of any golf club, so as to fit in with individual preference in driving a golf ball.

Every golf player knows that a golf links covers a big area of land of more than hundred thousand hectares and, it includes the green, the dimple, the teeing ground, the rough, the trap, the hill, the pool, and the forest, etc. While playing, one may have to carry a variety of clubs for driving a golf ball in different situations. The clubs include putter, midiron, mashie, cleek, and iron. Each kind of club is designed for specific use. For better performance, it is important to correct the stroke and the head. The present invention is directed to a golf club head surveying instrument to help making the correction.

The main object of the present invention is to provide a golf club head surveying instrument to help golf club manufacturers to check the quality of the angle of club head they are manufacturing, to help golf sporting goods distributors to adjust the angle of the clubs they are selling, and to help golf players to adjust the stroke and the head according to their personal preference.

Another object of the present invention is to provide a golf-club head surveying instrument to assist in the checking the quality of the stroke of any golf club and to assist in checking the head preferred so as to help golf player have better performance.

Another object of the present invention is to provide a golf club head surveying instrument of which the structure is more practical and compact to provide better performance in checking the inclination and balance of the stroke and the head of golf club.

A yet further object of the present invention is to provide a golf club head surveying instrument which is practical for checking either right-handed head or left-handed head of any golf club, such that all golf players can fully make use of the present instrument.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a perspective assembly view of a club head surveying instrument constructed according to the present invention.

FIG. 2 is right-side view of the preferred embodiment of FIG. 1.

FIG. 3 is a sectional view of the the preferred embodiment of FIG. 1.

DETAILED DESCRIPTION OF THE PREFERRED EMBODIMENT

Figure 4:
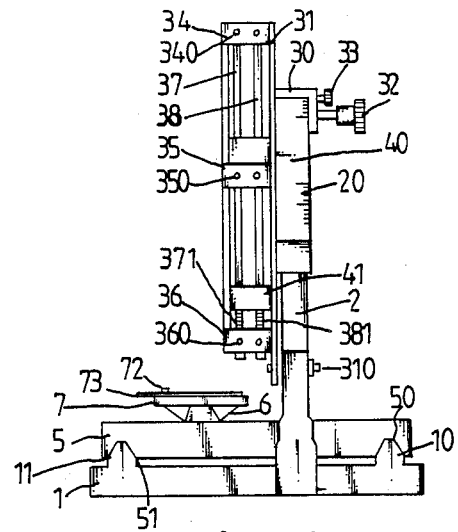
FIG. 4 is a back side view of the the preferred embodiment.

Referring to FIGS. 1 and 2, a club head surveying instrument according to the present invention includes a bottom block 1, a quarter circle scale plate 2, an adjusting frame 3, a V-shaped block 4, a balance block 5, a slide block 6, and a rectangular block 7.

The bottom block 1 comprises two triangular rails 10 and 11 bilaterally arranged on its top. The quarter circle scale plate 2 is connected to the bottom block 1 at its rear end near the central-left position thereof. The quarter scale plate has a graduated scale 20 on its circular top surface, an elongated curved hole 21 beneath the graduated scale 20. A smooth surface is provided on the right side of the circular side wall 210 below the elongated curved hole 21, and a convexly disposed curved rail cog 211 is provided on the left side of the circular side wall 210. A L-shaped plate 30 is mounted about the scale plate 2 and is fixedly attached to the elongated side plate 31 of the said adjusting frame 3 by means of two hexagon head bolts 300 and 301. The L-shaped plate 20 includes knob 32 penetrating through the elongated curved hole 21, so as to revolvably connect to the elongated side plate 31. The adjusting knob 32 includes a gear 320 (referring to FIG. 3) which rotates along the rail cog 211 of the elongated curved hole 21 of the scale plate 2. A locating knob 33 is revolvably provided to screw into the L-shaped plate 30 on the upper left side thereof and to exert further pressure on the scale plate 2 with its rear end when it is tightened, so as to prevent the adjusting knob 32 from revolving. The graduated scale 20 is provided at the front edge of the L-shaped plate 30 for reading angular position and providing guidance.

Figure 5:
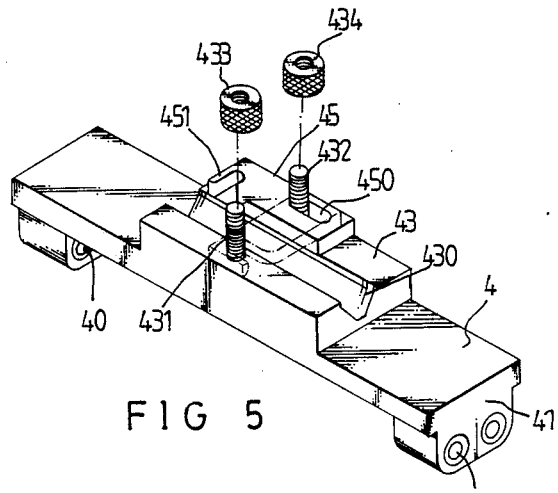
FIG. 5 illustrates the connection of the V-shaped block and the chuck plate.

The adjusting frame 3 is connected to the scale plate 2 through elongated side plate 31 by means of a bolt 310 revolvably provided on its front at a lower position. There are provided three fixing plates 34, 35 and 36 which are fixed to the adjusting frame by means of three hexagon head bolts 340, 350 and 360 on the back side at the upper, the middle and the lower position respectively. Two guide rods 37 and 38 are provided at the front of the adjusting frame 3 (as shown in FIG. 4). Two springs 371 and 381 are respectively mounted on the bottom end of the guide rods 37 and 38 and above the fixing plate 36. There is provided a V-shaped block 4 on the front side of the said adjusting frame 3. The said V-shaped block 4 comprises two protruding blocks 40 and 41 respectively arranged on its back side at both ends thereof for mounting on the guide rods 37 and 38 in a manner that protruding block 40 is arranged above the fixing plate 35, and protruding block 41 is arranged to press on the springs 371 and 381. Because the protruding blocks 40 and 41 are respectively arranged to provide a bearing 42 (referring to FIG. 5), the V-shaped block 4 can be adjustably mounted on the guide rods 37 and 38 so as to match with the length of any golf club to be tested, the springs 371 and 381 are arranged to support the protruding block 41 and to protect the fixing plate 36 from pushing against the said V-shaped block 4. The V-shaped block 4 also comprises an elongated protruding block 43 on its front side which has a V-shaped channel 430 thereon with two bolt necks 431 and 432 provided for setting thereon of a clamping element 45 by means of two respective nuts 433 and 434 to further firmly hold a golf club in the V-shaped channel 430. The said clamping element 45 is arranged to provide an elongated hole 450 on one side, and a hook portion 451 on the other side. When the nuts 433 and 434 are loosened, the clamping element 45 can be moved by means of the elongated hole 450, to break the hook portion 451 away from the bolt neck 431 for setting of golf club in the V-shaped channel 430.

Figure 6:
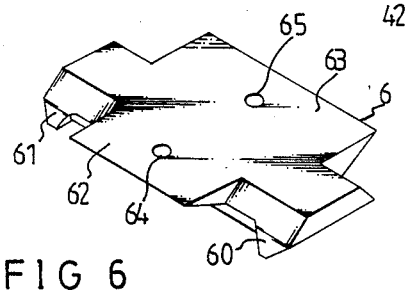
FIG. 6 is a perspective view of the slide block.
Figure 7:
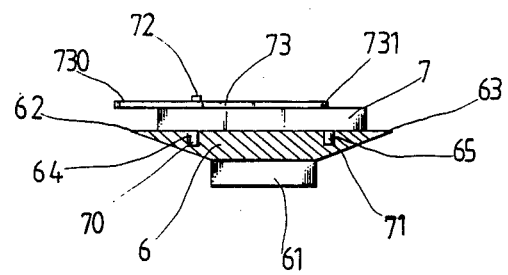
FIG. 7 is a sectional assembly view drawing of the slide block and the elongated rectangular block.

The balance block 5 comprises two triangular channels 50 and 51 respectively arranged at its bottom on both lateral sides thereof which match with the triangular rails 10 and 11 of the bottom block 1, so as to stably slide above the bottom block 1. The balance block 5 also comprises two slide channels 52 and 53 respectively arranged on its top on the front and rear ends thereof which match with the bilateral protruding blocks 60 and 61 downwardly extending from the slide block 6 (referring to FIG. 6), so as to let the slide block 6 slide along the slide channels 52 and 53 for easy adjusting of the position of the head of any golf club to be tested. The slide block 6 may be moved and reversely arranged to let the protruding block 60 and the protruding block 61 be set in the slide channel 53 and the slide channel 52 respectively, thereby accommodating the right-handed and the left-handed head of any golf club. The slide block 6 comprises a shorter bevel board 62 and a longer bevel board 63 respectively arranged on both lateral sides to define a respective bevel angle therebelow for setting therein of golf club head, wherein the shorter bevel board 62 is specifically designed for horizontal surveying of smaller golf club head, and the longer bevel board 63 is designed for horizontal surveying of larger club head (a putter, for example). The slide block 6 further comprises two round holes 64 and 65 respectively arranged on its two lateral sides for respectively setting therein of the two round-shaped stub tenons 70 and 71 of the rectangular block 7 (as shown in FIG. 7). A trifurcate balance board 73 is provided and turnably attached to the rectangular block 7 on its top by means of a bolt 72, wherein the forked portion 730 is arranged to protrude beyond the rectangular block 7 for checking of the balance of golf club head. The rectangular block 7 is arranged to provide a graduated scale 74 thereon (as shown in FIG. 1) for reading of angle indicated by the tip 731 of the trifurcate balance board 73. For position checking of the trifurcate balance board 73, it is performed by setting a gage block by the balance block 5 to push the forked portion 730 to determine if the tip 731 is positioned on the zero reading of the graduated scale 74.

Figure 8:
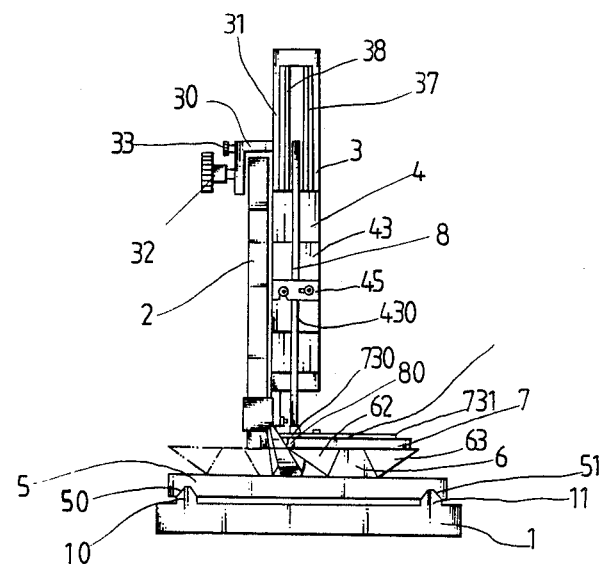
FIG. 8 illustrates the application of the preferred embodiment.

Referring to FIG. 8, when checking or assemblying the head 80 and the shaft 8 of a golf club, the shaft 8 is set in the V-shaped channel 430 and firmly held by the clamping element 45, the V-shaped block 4 is properly adjusted along the guide rods 37 and 38 to match with the length of the shaft 8 of the golf club to be tested, and the angle of the shaft 8 is preferably adjusted by means of the adjusting knob 32 through the display of the reading of the graduated scale of the L-shaped plate 30. After the angle of the stroke 8 is well adjusted, the locating knob 33 is screwed tight to firmly fix the adjusting frame 3, so that the head 80 can be set in the shorter bevel board 62 or longer bevel board 63 of the slide block 6. An angle gauge is then provided to set on the top of the slide block 6 to help determine the percentage inclination of the head 80. The slide block 6 is further moved to let the forked portion 730 of the trifurcate balance board 73 of the rectangular block 7 press on the head 80 for checking the balance and for checking the percentage of inclination according to the reading of the graduated scale 74 pointed by the tip 731 of the trifurcate balance board 73. Because the slide block 6 is removable and can be set on the top of the bottom block 1 in the reverse direction, the present instrument is practical for checking the right-handed head, as well as the left-handed head, of any golf club.

I claim:

1. A golf club head surveying instrument for checking a head of any golf club, which comprises a bottom block having a quarter circle scale plate mounted thereon;

said bottom block having a balance block mounted thereon, a slide block removably and reversibly mounted on said balance block for supporting a rectangular block and for receiving a right-handed head and left-handed head of any golf club, said rectangular block having a trifurcate balance board for balance checking of a head of a golf club to be tested;

said quarter circle scale plate including an adjusting frame fixed thereto at its rear end, a V-shaped block mounted on said adjusting frame having a clamping element for holding said golf club, and an adjusting knob arranged for angular adjustment of adjusting frame.

2. The instrument according to claim 1, wherein said quarter circle scale plate is attached at a rear portion of said bottom block at a central left position thereof and said bottom block includes two triangular rails respectively arranged on its top at both lateral sides thereof for slidably receiving said balance block.

3. The instrument according to claim 1, wherein a lower right side of said adjusting frame is fixed to said quarter circle scale plate by a bolt; and said quarter circle scale plate has a circular top surface portion with a graduated scale thereon, an elongated curved hole beneath said graduated scale, a circular side wall below said elongated curved hole having a smooth surface on its right side, and a convexly disposed curved rail cog on a left side of said circular side wall.

4. The instrument according to claim 1, wherein said adjusting frame includes an elongated side plate having a L-shaped plate attached thereto by two hexagon head bolts, said adjusting knob passing through an elongated curved hole of said quarter circle scale plate and including a gear rotating along a rail cog arranged within said elongated curved hole for adjusting a percentage of inclination of said adjusting frame; a locating knob rotatably provided in said L-shaped plate on its upper left side and tightening against said quarter circle scale for preventing said adjusting frame from moving by rotating of said adjusting knob; three fixing plates fixed to said adjusting frame on its back side at upper, middle and lower positions thereof by three hexagon head bolts respectively; two guide rods provided within said adjusting frame behind said fixing plates for receiving said V-shaped block; two springs respectively mounted on bottom ends of said guide rods and disposed above said bottom fixing plate for protecting said V-shaped block from pushing against said bottom fixing plate.

5. The instrument according to claim 1, where said V-shaped block includes two protruding blocks respectively arranged on its back side at both ends thereof, said protruding blocks each having a bearing for said guide rods to pass therethrough; said V-shaped block having an elongated protruding block on its front side with a V-shaped channel thereon and two bolt necks for receiving a clamping element held by two respective nuts; said clamping element having an elongated hole on one side and a hook portion on another side, and said elongated hole and said hook of said clamping element being arranged to firmly hold said golf club in said V-shaped channel by tightening of said nuts.

6. The instrument according to claim 1, wherein said balance block includes two triangular channels respectively arranged on its bottom at both lateral sides thereon, said two triangular channels slidably receiving triangular rails of said bottom block; said balance block including slide channels respectively arranged on its top on front and rear ends thereof for slidably receiving said slide block.

7. The instrument according to claim 1, wherein said slide block includes downwardly protruding blocks respectively received in slide channels of said balance block for position adjusting of said slide block, said slide block including a shorter bevel board and a longer bevel board respectively arranged on both its lateral sides for horizontal surveying of a smaller golf club head and a larger club head respectively, said slide block including two round holes respectively provided on both its lateral sides for fixation of said rectangular block thereon.

8. The instrument according to claim 1, wherein said rectangular block includes two round-shaped stub tenons to set in round holes of said slide block, said trifurcate balance board is attached thereto to said rectangular block by a bolt and has a forked portion protruding beyond an edge of said rectangular block for said balance checking of said head of said golf club to be tested; said rectangular block including a graduated scale thereon for reading of percentage of inclination of said head of said golf club to be tested by reference to a tip arranged within said forked portion of said trifurcate balance board.

* * * * *